E. H. SCHMIDT.
CENTERING DEVICE FOR RADIAL DRAFT GEARS.
APPLICATION FILED JUNE 5, 1911.
1,020,389.
Patented Mar. 12, 1912.
3 SHEETS—SHEET 1.
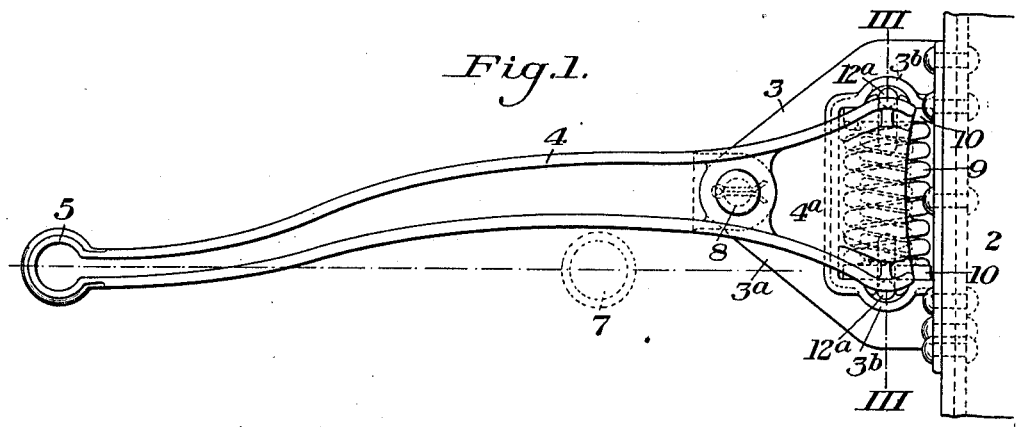
Fig. 1.
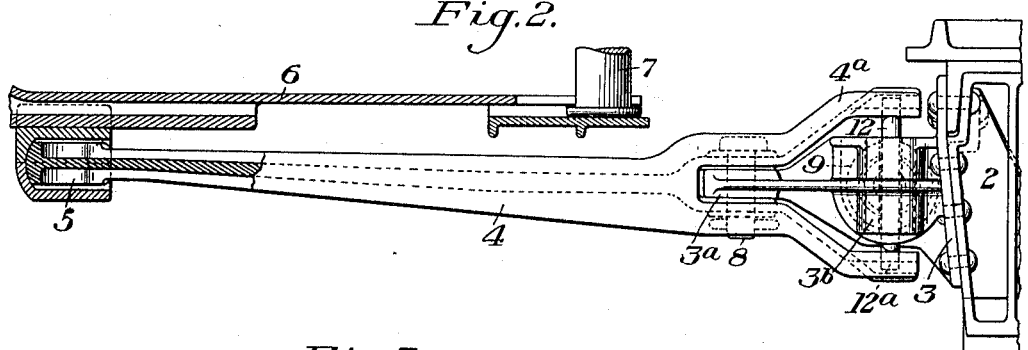
Fig. 2.
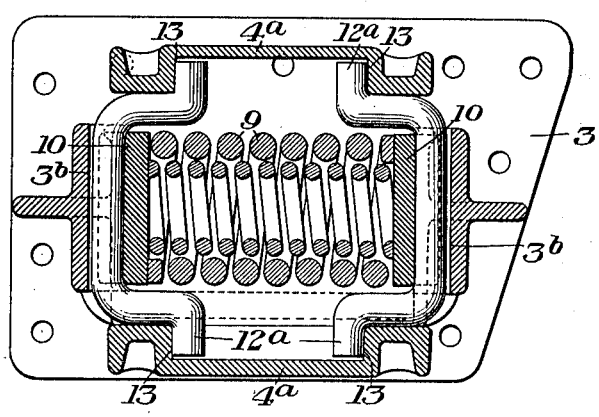
Fig. 3.
Fig. 4.
Fig. 5.
WITNESSES
R A Balderson
W Samaras
INVENTOR
E. H. Schmidt,
by Bakewell, Byrnes & Parmelee,
his Attys.
COLUMBIA PLANOGRAPH CO., WASHINGTON, D. C.

E. H. SCHMIDT.
CENTERING DEVICE FOR RADIAL DRAFT GEARS.
APPLICATION FILED JUNE 5, 1911.
1,020,389.
Patented Mar. 12, 1912.
3 SHEETS—SHEET 2.
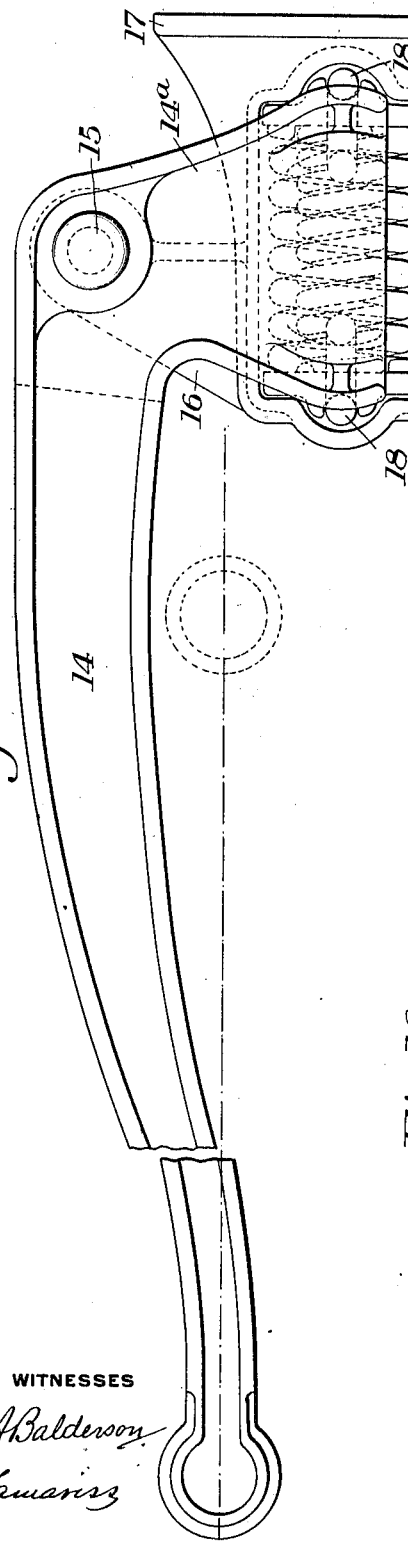
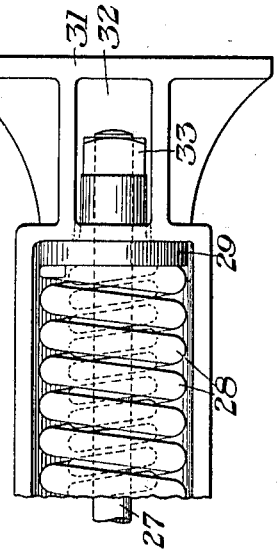
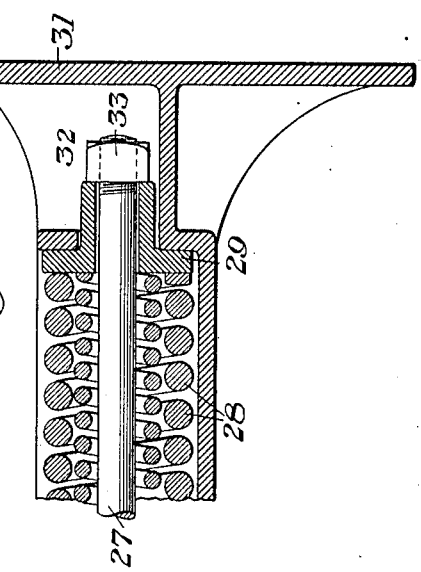

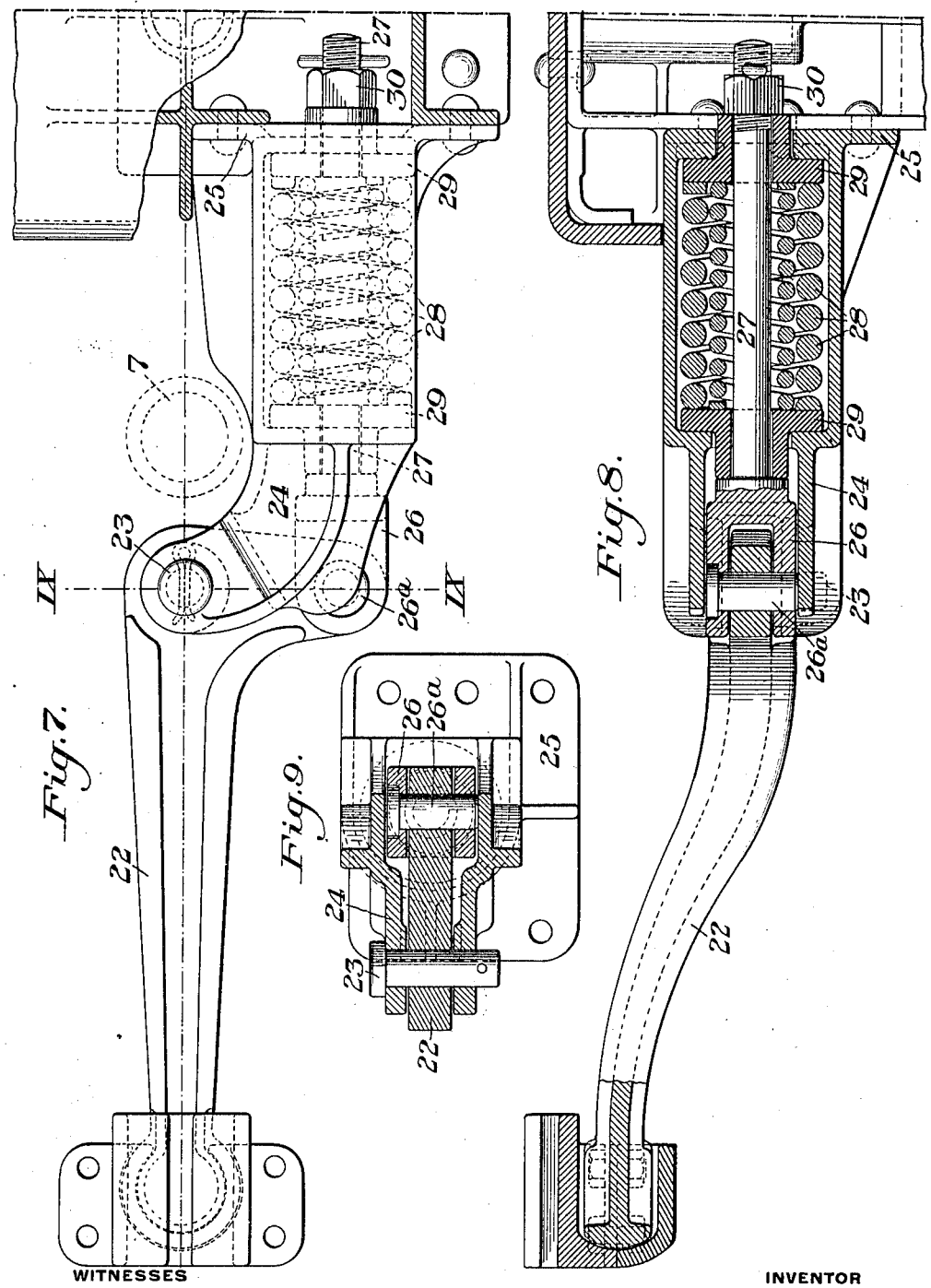

UNITED STATES PATENT OFFICE.

ERNEST H. SCHMIDT, OF CLEVELAND, OHIO, ASSIGNOR TO THE NATIONAL MALLEABLE CASTINGS COMPANY, OF CLEVELAND, OHIO, A CORPORATION OF OHIO.

CENTERING DEVICE FOR RADIAL-DRAFT GEARS.

1,020,389.  Specification of Letters Patent.  Patented Mar. 12, 1912.

Application filed June 5, 1911. Serial No. 631,377.

*To all whom it may concern:*

Be it known that I, ERNEST H. SCHMIDT, of Cleveland, Cuyahoga county, Ohio, have invented a new and useful Improvement in Centering Devices for Radial-Draft Gears, of which the following is a full, clear, and exact description, reference being had to the accompanying drawings, forming part of this specification, in which—

Figure 1 is a plan view of a guiding connection for radial draft gears embodying my invention, the pivot pin for the draft gear being shown in dotted lines; Fig. 2 is a view of the same, partly in side elevation and partly in section, and also showing a portion of the radial movable draft member and its pivot pin; Fig. 3 is a section on the line III—III of Fig. 1; Fig. 4 is a detail view of one of the crank members; Fig. 5 is a detail perspective view of one of the followers; Fig. 6 is a view similar to Fig. 1, but showing a modification; Fig. 7 is a plan view, partly broken away, showing another modification; Fig. 8 is a view partly in side elevation and partly in vertical section of the form of my invention shown in Fig. 7; Fig. 9 is a section on the line IX—IX of Fig. 7; Fig. 10 is a detail sectional view showing a portion of the spring and plunger of the modification of Figs. 7, 8 and 9; and Fig. 11 is a plan view of the part shown in Fig. 10.

My invention has relation to radial draft gears; and more particularly to radial draft gears of that type in which the guiding connection between the draft member and the truck consists of a single member or arm, which normally lies substantially at right angles to the truck bolster at its center as described and claimed in a co-pending application of mine, Serial No. 440,288, filed June 25, 1908. In radial draft gears of this type, the guide arm, or its connections heretofore provided, occupies such a position with relation to the pivot pin and the draft gear that it is impossible to remove such pivot pin from below without disassembling or removing the truck connections. This involves either the removal of several pins or springs, or the disconnecting of the truck connection bracket wholly from the truck in order to get at the draft gear pivot pin. These operations increase the difficulty of disassembling the gear for repairs.

The object of my invention is to provide a guiding connection of such form and arrangement that all its parts will be entirely clear of the pivot pin of the draft gear, so that the latter can easily be removed without disconnecting any of the parts of the guiding connection.

Referring first to that form of my invention which is shown in Figs. 1 to 5, inclusive, the numeral 2 designates a portion of a truck bolster; and 3 is a bracket which is secured to the front face of such bolster. 4 is the guiding arm which is provided at its forward end with a head 5 for engagement in any suitable manner with some portion of the swinging part of the draft gear, as shown, for instance, in the patent to Henry F. Pope, 977473, of December 6, 1910. The numeral 6, in Fig. 2, designates a portion of the swinging draft gear member to which the guiding arm 4 is connected. 7 designates the pivot pin for the draft gear and which is of the usual form and arrangement. The rear portion of the arm 4 is offset laterally with respect to the longitudinal center line passing through the center of the coupler, the draft gear, its pivot pin, and the car, when the car is standing upon a straight track. This laterally offset rear portion of the arm is pivoted near its rear end, by means of a pin or pivot 8, to a forwardly projecting portion $3^a$ of the bracket 3 before described. The rear end portion of the guiding arm is bifurcated or forked, as shown at $4^a$, the forked ends embracing above and below the forwardly projecting portion $3^a$ of the bracket. Seated within this bracket, between the forked ends of the guiding arm, are centering springs 9 which extend transversely to the longitudinal center line above referred to, and which bear at each end against follower members 10. These follower members 10 have vertically extending grooves 11 in their outer faces, as shown in Fig. 5, for engagement with bail-shaped or cranked members 12, whose vertically extending offset end portions $12^a$ engage the inner vertical sides of shoulders or ledges 13 on the forks of the guiding arm. These members 12 are prevented from outward movement away from the ends of the springs by the engagement of their rear edges with the side walls 3$^b$ of the bracket 3, as clearly shown in Fig. 3. It will readily be seen that the swinging movement of the guiding arm will actuate the members 12 to effect a compression of the centering spring; and that the latter will act to return the guiding arm to its normal position as soon as the disturbing forces cease. The offsetting of the rear portion of the guiding arm to one side of the longitudinal center line is sufficient to bring such portion entirely to one side of the draft gear pivot pin 7, as is clearly shown in Fig. 1, and thus leave said pin entirely free to be removed without disturbing or disconnecting any of the parts of the guiding connection.

In the modification shown in Fig. 6, the centering springs instead of being arranged transversely to the longitudinal center line of the car, are arranged parallel to said center line. This construction, necessitates a slightly different location of the pivot pin for the arm; a somewhat different shape of the arm itself; and a modified form of the bracket. The guiding arm, designated in this figure, by the reference character 14, has its short rear arm 14$^a$ extending at substantially right angles to the longitudinal center line above defined, and the arm is pivoted at its angle by the pin 15 to a laterally projecting portion 16 of the bracket 17. The rear arm 14$^a$ is bifurcated, as in the form first described, and is engaged with the bail-shaped or crank members 18 in substantially the same manner as in the form first described, the centering springs 19 being arranged longitudinally between the two followers 20 and 21, which are engaged with said members 18.

In the modification shown in Figs. 7 to 9 inclusive, the guiding arm 22, instead of being forked at its rear end, is in the form of a single bell crank lever, pivoted at 23 to a forwardly projecting portion 24 of the truck connection bracket 25. The portion 24 of the bracket projects forward a sufficient distance to bring the pivot 23 in front of the draft gear pivot pin 7, the center line of both these pins being in the longitudinal center line before defined. The shorter arm of the bell crank is connected by means of a clevis 26 and pin 26$^a$ to the front end of a plunger or tail bolt 27. The centering springs 28 are mounted within the bracket 25 so that their center line is parallel to the center line of the car. These springs bear at their front and rear ends upon the thimble members 29, the front thimble member abutting at its forward end against the shank of the clevis 25; and the rear end of the rear thimble member abutting against a nut 30 secured upon the threaded rear end of the plunger 27. The connections just described, enable the plunger to compress the centering springs when moving either forwardly or rearwardly, so that said springs will cause the guiding arm to return to its normal position. In this form of my invention, the bracket, springs, etc., are offset from the center line so that the pivot pin 7 is left unobstructed, as in the other forms.

Figs. 10 and 11, show a modified way of seating the nut on the end of the tail bolt or plunger of the form of Figs. 7, 8 and 9. In those figures, the nut 30 is shown as seated within the truck bolster. In Figs. 10 and 11, the truck connection bracket 31 is shown as having a pocket 32 formed therein to receive this nut, which is held from turning by the ribs, and which in these two figures is designated at 33.

The advantages of my invention will be apparent to those skilled in the art and who have experienced the difficulties above referred to in getting access to the draft gear pivot pin from below.

My invention in its broadest aspect consists in the provision of a truck connection comprising a single guiding arm which is so constructed and arranged that, while the forward portion which engages the draft member is centrally located, no portion of such arm lies beneath the pivot pin of the draft gear. The particular shape and construction of the said arm, the particular means for its engagement with a centering spring or springs, and the particular plan of mounting on the truck may, therefore, be widely varied without departing from the spirit and scope of my invention as defined in the appended claims.

What I claim is:

1. In a radial draft gear, a centering device comprising a single pivoted guiding arm forming a connection between the draft gear and the car truck, said arm having the portion thereof which is connected to the draft gear extending in the center line of the draft gear, and having that portion which is adjacent to the draft gear pivot pin offset laterally with respect to said pivot pin; substantially as described.

2. In a radial draft gear, a centering device comprising a single pivoted guiding arm forming a connection between the draft gear and the car truck, said arm having the portion thereof which is connected to the draft gear extending in the center line of the draft gear, and having that portion which is adjacent to the draft gear pivot pin offset laterally with respect to said pivot pin, and a spring device associated with said arm to tend to hold it in its normal central position; substantially as described.

3. In a radial draft gear, a centering device comprising a single pivoted guiding arm forming a connection between the draft gear and the car truck, said arm having the portion thereof which is connected to the draft gear extending in the center line of the draft gear, and having that portion which is adjacent to the draft gear pivot pin offset laterally with respect to said pivot pin, and centering springs connected to the offset portion of the arm; substantially as described.

In testimony whereof, I have hereunto set my hand.

ERNEST H. SCHMIDT.

Witnesses:
CHESTER K. BROOKS,
HARRY E. ORR.

Copies of this patent may be obtained for five cents each, by addressing the "Commissioner of Patents, Washington, D. C."